(12) United States Patent
Damkjaer

(10) Patent No.: US 7,828,136 B2
(45) Date of Patent: Nov. 9, 2010

(54) SIDE-FLEXING CONVEYOR BELT

(75) Inventor: Poul Erik Damkjaer, Vejle (DK)

(73) Assignee: Uni-Chains A/S, Vejle (DK)

( * ) Notice: Subject to any disclaimer, the term of this patent is extended or adjusted under 35 U.S.C. 154(b) by 619 days.

(21) Appl. No.: 11/525,144

(22) Filed: Sep. 20, 2006

(65) Prior Publication Data

US 2007/0181409 A1     Aug. 9, 2007

Related U.S. Application Data

(63) Continuation-in-part of application No. 11/260,909, filed on Oct. 28, 2005, now Pat. No. 7,419,051.

(30) Foreign Application Priority Data

Oct. 29, 2004   (DK)   ................................ 2004 01669

(51) Int. Cl.
*B65G 17/06* (2006.01)
(52) U.S. Cl. ...................... 198/853; 198/850; 198/852
(58) Field of Classification Search ................. 198/853, 198/852, 850
See application file for complete search history.

(56) References Cited

U.S. PATENT DOCUMENTS

| | | | | |
|---|---|---|---|---|
| 2,681,728 | A * | 6/1954 | Boron | 198/851 |
| 3,628,834 | A | 12/1971 | Anderson | 305/35 R |
| 4,159,763 | A * | 7/1979 | Kewley et al. | 198/853 |
| 4,222,483 | A * | 9/1980 | Wootton et al. | 198/831 |
| 4,394,901 | A | 7/1983 | Roinestad | 198/850 |
| 4,615,343 | A | 10/1986 | Komossa | |

(Continued)

FOREIGN PATENT DOCUMENTS

DE            10027229         12/2001

(Continued)

*Primary Examiner*—Gene Crawford
*Assistant Examiner*—Kavel P Singh
(74) *Attorney, Agent, or Firm*—Woodcock Washburn LLP

(57) ABSTRACT

A conveyor is described comprising an endless side-flexing conveyor belt made from a number of rows of hinged interconnected belt links, where each row comprises at least one link, where each link has a front end, a back end, a top surface, a bottom surface and two sides, where hinge parts separated by apertures are arranged along the front end and the back end such that front hinge parts on the front end will fit inside apertures on the back end of an adjacent belt link, and where the front end and back end are substantially parallel to a first axis parallel to the width direction of the link, wherein the hinge parts of each link are defined by a top and bottom that are substantially flush with the top and bottom surfaces respectively, and two side surfaces and a free front surface, and that at least some of the front hinge parts are provided with a protrusion on one or both side surfaces, where these protrusions fit inside elongated apertures provided in the side surfaces of the rear hinge parts on the opposite end of the links; and further that the portions of the protrusions and/or of the elongated apertures that engage each other during use of the belt are arranged such that the they are parallel to different axes depending upon whether they are closer to the middle or one of the two ends so that there will be multiple points of contact between adjacent links even when the belt is side-flexing around a curve.

28 Claims, 8 Drawing Sheets

U.S. PATENT DOCUMENTS

| | | | | |
|---|---|---|---|---|
| 4,972,942 A * | 11/1990 | Faulkner | ...................... | 198/853 |
| 5,024,321 A * | 6/1991 | Lapeyre | ...................... | 198/853 |
| 5,346,056 A * | 9/1994 | Quaeck | ................... | 198/750.3 |
| 5,346,059 A * | 9/1994 | Irwin | ......................... | 198/852 |
| 5,497,874 A | 3/1996 | Layne | ........................ | 198/698 |
| 5,775,480 A | 7/1998 | Lapeyre et al. | ............... | 198/831 |
| 5,921,379 A * | 7/1999 | Horton | ....................... | 198/852 |
| 6,068,112 A * | 5/2000 | Kasai et al. | .................. | 198/853 |
| 6,471,048 B1 * | 10/2002 | Thompson et al. | ........... | 198/853 |
| 6,615,979 B2 * | 9/2003 | Etherington et al. | ......... | 198/851 |
| 6,732,856 B2 | 5/2004 | Maine, Jr. | ................... | 198/850 |
| 6,896,126 B2 * | 5/2005 | Guldenfels | .................. | 198/853 |

FOREIGN PATENT DOCUMENTS

| | | |
|---|---|---|
| EP | 0175483 | 3/1986 |
| EP | 427737 | 5/1991 |
| EP | 0878148 | 11/1998 |
| EP | 1219550 | 7/2002 |
| EP | 1306323 | 5/2003 |
| NL | 9101711 | 5/1993 |
| WO | WO 97/28072 | 8/1997 |

\* cited by examiner

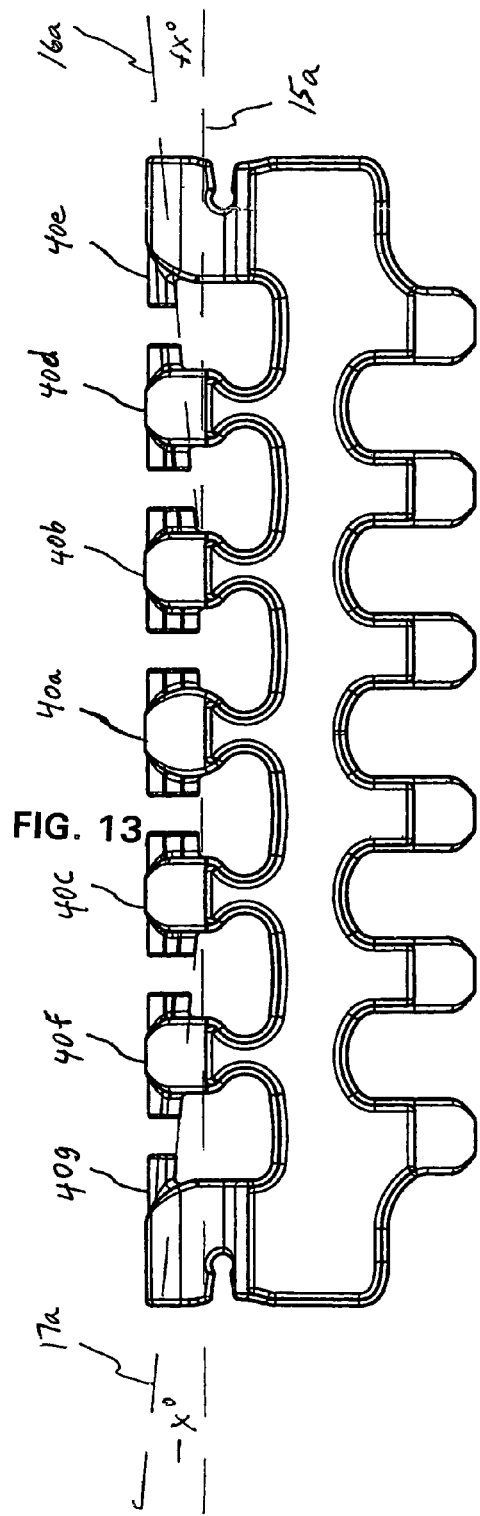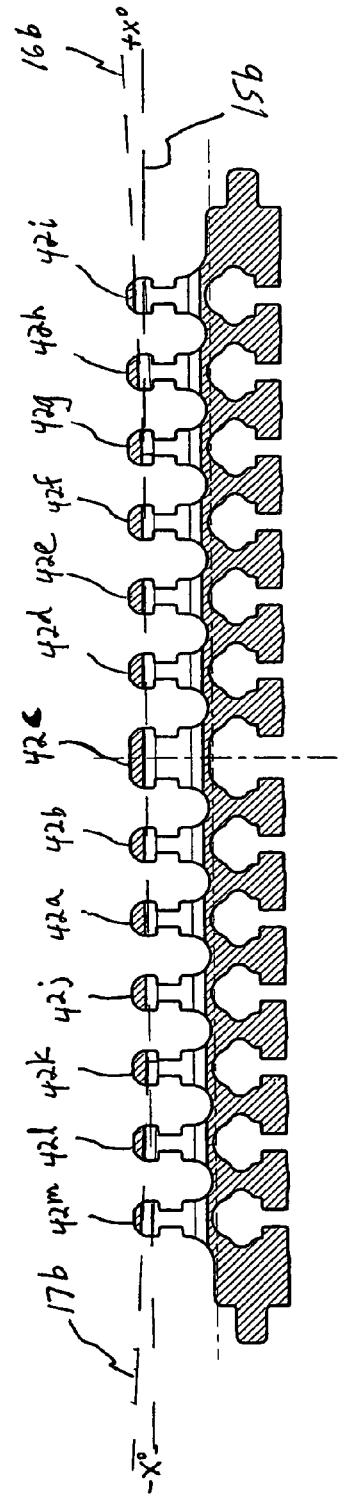

SIDE-FLEXING CONVEYOR BELT

CROSS-REFERENCE TO RELATED APPLICATIONS

This patent application is a continuation-in-part of U.S. patent application Ser. No. 11/260,909, filed Oct. 28, 2005, which claims the benefit of Danish Application No. PA 2004 01669 filed Oct. 29, 2004, both of which are incorporated herein by reference in their entirety.

FIELD OF THE INVENTION

The present invention relates to a conveyor comprising an endless side-flexing conveyor belt made from a number of rows of hinged, interconnected belt links.

BACKGROUND OF THE INVENTION

It is known to have endless belt conveyor assemblies that are side-flexing. Usually, this construction is made by providing apertures in the front and back hinge parts of a belt module perpendicular to the travelling direction. By overlapping the hinge parts of two adjacent chain or belt links, and inserting a transverse rod through the apertures, thereby connecting two adjacent links in a hinge-like manner, the two adjacent links will be able to flex relative to each other due to the ability of the rod to move in the elongated shape of the overlapping apertures.

Such prior art constructions are known from, for example, EP 427337, EP 1306323 and others.

Prior art conveyors with endless belts typically have a number of drawbacks.

When conveyors are to transport food stuffs, either in raw or manufactured form, there are varying degrees of hygiene requirements that must be maintained for all equipment involved in the processing of food stuffs. Especially for fresh food stuffs, it is important to have an extremely high level of hygiene in order to avoid contamination of the food stuffs from residue stuck in the belt construction, or from other sources arising from an inability to satisfactorily clean and disinfect the endless belt conveyor.

A serious drawback of conveyors of this type is the fact that, as the conveyors are loaded and going through a curve, a substantial force will be induced in the outer part of the conveyor belt where the main part of the tension arises due to the pulling forces propelling the endless belt conveyor. A number of solutions have been proposed where reinforcement plates, sometimes in the shape of steel plates, are arranged in the outer sections connecting adjacent belt links such that these steel links will transfer the substantial forces arising when such an endless conveyor belt flexes to one side or the other.

It has also been suggested to reinforce the transverse rods such that the rods will be able to transfer the load from one flexing link to the adjacent link. However, when the transverse rods are made from plastic materials, normal wear and tear results in a very limited life expectancy, which then results in increased maintenance costs and extended periods of down time for the conveyor. By replacing the plastic transverse rods with steel rods, as has also been suggested in the prior art, the wear and tear is transferred from the rods to the hinge parts that are integral with the links with the result being that, eventually, the hinge parts will be worn down and the entire link will need to be replaced.

Returning to the issue of hygiene, it has also proven very difficult to thoroughly clean the apertures in which the transverse rods are arranged. This is due to the fact that the apertures have a limited size, but still provide play for the transverse rods such that the side-flexing capabilities of the entire conveyor belt may be provided in a substantially effortless manner, i.e., such that no substantial friction arises in the hinge parts that could lead to heat generation and deterioration of the plastic material. This play, and the corresponding oversizing of the apertures, allows for foreign matter, for example organic residue originating from the materials being transported on the conveyor, to become lodged in various spots that will only be removed during the cleaning process if particular care is used. The residual organic material that is often left will give rise to bacteria growth, which may cause contamination of the articles transported on the conveyor belt which, in turn, might lead to serious complications for the end user.

SUMMARY OF THE INVENTION

Object of the Invention

It is, therefore, an object of the present invention to provide a conveyor having an endless side-flexing conveyor belt, where the drawbacks mentioned above are alleviated, and that provides additional advantages which will be evident from the following description.

Description of the Invention

This object has been achieved by providing a conveyor comprising an endless side-flexing conveyor belt made from a number of rows of hinged, interconnected belt links, where each row comprises at least one link, where each link has a front end, a back end, a top surface, a bottom surface and two sides, where hinge parts each separated by apertures are arranged along the front end and the back end such that front hinge parts on the front end will fit inside apertures on the back end of an adjacent belt link, and where the front end and back end are substantially parallel to a first axis parallel to the width direction of the link, wherein the hinge parts of each link are defined by a top and bottom that are substantially flush with the top and bottom surfaces respectively, and two side surfaces and a free front surface, and that at least some of the front hinge parts on one end of each link are each provided with protrusions on one or both of their side surfaces, where these protrusions fit inside elongated apertures provided in the side surfaces of the rear hinge parts on the opposite end of the links.

In one embodiment of the invention, the protrusions on more than one of the front hinge parts arranged centrally on the link are arranged on an axis parallel to the first axis, and at least the protrusions on one or more of the outermost front hinge parts on one side of each link are arranged parallel to an axis angled +x° in relation to the first axis and one or more protrusions on the opposite side of each link are arranged parallel to an axis that is angled approximately −x° in relation to the first axis. Alternatively, if the intended use only requires the ability to flex in one direction, then it would not be necessary to have both the +x° and −x° arrangements.

In a second embodiment, the protrusions on more than one of the front hinge parts arranged centrally on the link are arranged on an axis parallel to the first axis, and the thickness in the travelling direction of the protrusions on one or more of the outermost front hinge parts on one side of each link is varied, with the thinner protrusion or protrusions being closer to the side of the link, such that the sides of these protrusions opposite the front of the link are parallel to an axis angled +x° in relation to the first axis, and the thickness in the travelling direction of one or more of the protrusions on the opposite side of each link is varied, with the thinner protrusion or protrusions being closer to that opposite side of the link, such that the sides of these protrusions opposite the front of the link are parallel to an axis angled approximately −x° in relation to the first axis.

In a third embodiment, the length in the travelling direction of one or more of the elongated apertures in the rear hinge parts arranged centrally on the link is constant such that the ends of these elongated apertures nearest the back end of the link are arranged on an axis parallel to the first axis, and the length in the travelling direction of one or more of the outermost rear hinge part elongated apertures on one side of the link is varied, with the length being greater in the elongated aperture or apertures closer to the side of the link, such that the ends of these outer elongated apertures nearest the back end of the link are parallel to an axis angled +x° in relation to the first axis, and the length in the travelling direction of one or more of the outermost rear hinge part elongated apertures on the opposite side of the link is varied, with the length being greater in the elongated aperture or apertures closer to that opposite side of the link, such that the ends of these outer elongated apertures nearest the back end of the link are parallel to an axis angled −x° in relation to the first axis.

With this construction, the connection between two adjacent belt links is established without the use of a transverse rod such that the problems relating to the transverse rod as described above are alleviated. Furthermore, by being able to assemble adjacent belt links without the use of a rod, substantial savings in the moulds for shaping the belt links may be achieved. Moreover, assembly of two adjacent belt links is simplified, which again provides a cost-saving parameter that is substantial in that an endless belt conveyor traditionally comprises a very large number of belt links that need to be assembled and, by avoiding the transverse rod assembly, the savings when assembling two adjacent links becomes considerable when multiplied by the number of assemblies that are necessary in order to assemble the entire conveyor belt.

The protrusions that effectively replace the transverse rods are moulded as integral parts of the belt link. As such, no foreign matter will be able to become lodged in the connection between the protrusions and the hinge parts, which are fairly easy to clean. Due to the fact that the protrusions only fill a limited part of the space, the elongated apertures provided in the rear hinge parts that are located on the opposite side of the links from the front hinge parts with the protrusions have a larger opening. This facilitates the spraying of cleaning fluid into the apertures and the draining of that fluid out again such that an improved cleaning process may be achieved.

Furthermore, by angling the orientation of the outermost protrusions at both sides, either by angling the protrusions themselves or by varying the thickness of the protrusions, the tension arising in the belt links as the conveyor belt goes through a curve is divided on a number of equally loaded protrusions, such that the force transferred to the protrusions is not taken up by only one protrusion, mainly the outermost, but may be distributed on a number of protrusions. Alternatively, the same advantage can be obtained by varying the thickness of the elongated apertures into which the protrusion fit. In any of the three variations, as the belt runs through straight sections, the centrally arranged front hinge parts with integral protrusions will transfer the force from one link to the other. In this manner, the force resulting from rotating the loaded conveyor belt is always transferred from one belt link to the adjacent belt link by a number of protrusions, such that the forces distributed thereby will have a lesser impact on each hinge part.

In a further advantageous embodiment, at least some of the protrusions have an elongated cross-section such that the length "a" of the protrusion in the intended travelling direction of the conveyor belt is longer than the height "b" of that protrusion perpendicular to the length. The elongated cross section of such protrusions provides for optimum load transferring possibilities from the protrusions into the hinge part with which it is integrally formed, and thereby to the bulk of the material of the belt link. As the elongated shape allows for the side-flexing capabilities of the assembled conveyor belt, due to the even longer elongated apertures in which the protrusion are intended to be arranged, the elongation of the protrusions does not impede the entire conveyor's ability to have side-flexing capabilities.

In a further advantageous embodiment, a recess is provided in the side surfaces of the rear hinge parts in which apertures are arranged such that the recess connects the aperture with the bottom of the rear hinge.

By providing such a recess in the bottom section of the belt link, any moisture/liquid that may otherwise be present in the aperture will more easily drain. The recesses in the rear hinge parts equipped with apertures may advantageously not connect such that a separate recess is provided on either side of each rear hinge part. In this manner, the rear hinge parts' strength is maintained in that a bridge is maintained in the lower part of the rear hinge part for transferral of forces, and at the same time the recess will provide the best possible draining in the aperture.

In a still further advantageous embodiment, the recesses have openings in the intended travelling direction that have a width "c" where a>c>=b. Having this relationship between the protrusions on the front hinge parts and the recesses on the rear hinge parts makes it possible to place and connect adjacent belt links by simply turning one belt link 90° in relation to the adjacent belt link. In this manner, the shortest dimension "b" of the hinge part protrusion on one belt link will be able to pass, perhaps by applying a slight force, through the opening "c" provided in the recess on the corresponding rear hinge part of the other belt link. This is only possible when the extent of the protrusion in the width direction of the conveyor belt is less than the depth of the corresponding recess in the width direction of the conveyor belt plus the built-in play between the front hinge parts and the apertures between two rear hinge parts.

In comparison to conveyor belts where adjacent belt links are connected by means of transverse rods, the assembly and disassembly, and thereby also the replacement of each link or a number of links, of the present invention is especially advantageous in that no tools nor a number of separate parts are necessary in order to replace the links. A link is simply pivoted approximately 90° in relation to an adjacent link, and may be removed either by simply pulling the links apart, or by inserting, for example, a screwdriver in the aperture between two rear hinge parts and carefully exerting a little pressure whereby the hinge part protrusion will pop out through the recesses provided in the adjacent belt link. In a similar manner, two belt links may be assembled simply by placing one link at a 90° orientation to the link to which it is supposed to be connected such that the hinge part protrusions are superposed over the recesses. By applying a slight tap to the belt link, the protrusions will slide through the recesses, and, by then pivoting the belt links into substantially the same plane, a hinge-like connection is established.

In a further advantageous embodiment of the invention, the angle x° is in the range of 0°-8°, more preferably 1°-5°, and most preferably 2°-3.5°. These intervals for orientating the axis in relation to the main axis perpendicular to the intended travelling direction are selected such that the conveyor belt will be able to go through turns having a radius corresponding to no more than two times the width of the conveyor belt. For traditional side-flexing conveyor belts where the belt links are assembled by means of transverse rods, the normal design provides for a turning radius of 2.2 times the width of the belt. In this manner using the inventive conveyor belt according to the present invention, tighter turns and a better load transfer between each link are achieved.

In a further advantageous embodiment, the width of the conveyor corresponds to the width of only one belt link, and at least two or more front hinge parts on each side of the link comprise protrusions that are arranged parallel to axis angled approximately +/−x° with respect to the first axis, and that the protrusions on at least two or more centrally arranged front hinge parts are arranged on a common axis parallel to the first axis. Due to the construction of the links in the conveyor belt, it is possible to manufacture the links in a substantial width. For a number of applications, the width of the belt may be bridged by one single link. In other applications as suggested above, the links may be assembled in a bricklaying pattern in order to create the desired width of the resulting conveyor. However, when the conveyor is made up of one single belt link in the width direction, the links may be constructed such that their integrity provides a central carrying member spanning the entire width of the belt links on which carrying member the integrally arranged hinge parts are provided. In accordance with the present invention, it then becomes possible to only support the conveyor belt along the sides of the belt links. At the same time, with the angular relationship between the protrusions (or elongated apertures) at the sides in relation to the protrusions (or elongated apertures) in the central part of the belt link, the fully side-flexing capabilities are maintained.

In a still further advantageous embodiment of the invention, the apertures between the front hinge parts has a generally key-hole shaped configuration when seen in the transport plane of the belt, and the rear hinge parts are generally rectangular such that the width of the rear hinge parts perpendicular to the intended transport direction substantially corresponds to the narrowest section of the key-hole-shaped aperture. Using this structure, when two adjacent belt links are pushed together, it is possible for gas and/or liquid to pass through the belt in a direction substantially perpendicular to the transport plane of the belt.

Maintaining open space even when two adjacent belt links are forced together provides a number of advantages that may be exploited in different applications. In situations where it is desirable to provide drainage, the liquids may leave the conveying surface through the apertures provided in the conveying surface. Furthermore, in some applications, for example in connection with ovens for baking bread, pizza and the like, it is desirable to be able to cool the objects before they are transferred to later processes such as packaging and the like. In these instances, it might be desirable to circulate cooling air through the conveyor belt in order to cool the objects placed on the conveyor. This is facilitated by the apertures, for example as provided by designing half the apertures as key-holes, whereby it will be possible under all circumstances to circulate ventilation air through the conveyor. This is also true if the air/gas is a cooling media, which may advantageously be used in freezing tunnels and the like.

In a further advantageous embodiment, the links are made from a plastic material and the links are continually manufactured in an injection-moulding process, such that the links are assembled preferably near the injection-moulding machine in lengths of the conveyor belt, for example in lengths 2 m to 6 m, and more preferably 3 m to 5 m. One of the problems associated with injection-moulding of plastic belt links of the size contemplated by the present invention is the tendency of the links immediately after being moulded and de-moulded to twist, or otherwise deform. For this purpose, the links may advantageously be placed on a flat surface in order to cool, whereby the plastic material achieves a certain degree of internal integrity, and thereby will be less likely to deform. By further using means such as a robot for moving the belt links from the flat surface after cooling and into storage, but before placing in storage assembling the links as described above into finished conveyor belts sections that may be, for example, 2 m up to 6 m, the later procedures of assembling the conveyor belt may be substantially minimized in that a substantial part of the finished conveyor belt already is pre-assembled at the factory.

In a further advantageous embodiment, substantial cleaning advantages are achieved by having, in the rear hinge parts wherein elongated apertures are provided in the rear hinge parts side surfaces, an aperture perpendicular to the top surface and connecting the elongated apertures with the top surface. The aperture connecting the top surface of the belt links with the elongated apertures in the side surfaces of the rear hinge parts improves the cleaning process in that means may be arranged adjacent to the conveyor belt, for example underneath or anywhere suitable, that will provide water jets that may flush out any material that may be stuck in the aperture, or more importantly in the elongated apertures in the rear hinge parts. Furthermore, by having the side-flexing motion of the adjacent belt links, the hinge part protrusions fixed in the elongated apertures in the rear hinge parts will also induce a mechanical scrubbing of the elongated apertures by allowing liquid through the apertures connecting the top surface to the elongated apertures. This allows for a very high degree of cleaning, and an improved hygienic standard for the entire conveyor belt.

In a still further advantageous embodiment of the invention, the conveyor may, depending on its particular use, be provided with one or more of a variety of additional features on each or selected belt links. These additional features are selected, or combined, from the following:

on the outermost side surfaces of the outermost front hinge parts on either side of the conveyor belt, an especially reinforced wear plate, for example made from, or comprising, Kevlar;

rollers arranged for rotation around an axis perpendicular to the top surface where the rollers extend slightly outside the side surfaces and are either arranged as snap-on units or as integrally moulded with the belt links;

compartment members arranged perpendicular to the top surface and extending substantially the entire width of the belt link;

side plates extending substantially perpendicular to the top surface, and parallel to the sides of the belt links, and extending in the direction parallel to the sides such that the side plates extend beyond the belt link's front and/or back end;

ribs provided parallel to the intended transport direction of the conveyor, where said ribs extend perpendicularly from the top surface of the belt links;

guidance flanges provided on the sides and extending from the sides, such that the top surface of the flanges are lower the top surface of the belt link, where the guidance flanges are either integral with the belt links or provided as snap-on flanges; and friction-enhancing substances are applied to the top surface of the belt links, such as rubber or the like.

The wear plate, especially when it is made from a Kevlar-based material, is substantially tougher than the traditional plastic materials from which the belt links are moulded. A substantial wear may arise in the conveyor belt when the belt is forced through relatively tight turns, whereby the belt links engage with the side supports of the conveyor structure on which the conveyor belt is mounted. Advantageously, the wear plates may be snap-on parts such that they may be easily replaced from time to time during normal service and maintenance of the conveyor belt. Alternatively, the outermost sections of the belt links may be moulded such that the reinforcement, for example Kevlar, is integral with the belt link.

The plate can also be designed to have a shape that generally mimics the curve of the conveyor belt as it is contracted while flexing around an inward turn. Having the side of the wear plate on the outside of the belt link shaped in a generally convex manner when viewed from the front to the back of the belt link causes there to be at least two, and possibly more, points of contact between the wear plate and the side supports of the conveyor structure when the belt flexes around an inside turn, which will reduce wear on the part itself, vibration, shatter, noise, and the creation of frictional heat while allowing for a smoother conveyor belt ride. Such a construction may also allow for higher belt speeds without heating the wear part to critical temperatures.

The compartment members that are arranged as small walls between adjacent belt links serve to help transport materials placed on the conveyor up or down inclines in the conveyor's run. This is particularly useful when the materials or objects to be transported are granular, or where there is low friction between the objects and the belt links, for example due to the presence of water or other materials. The compartment members will maintain an even distribution of load on the conveyor belt as the conveyor belt travels up or down inclines.

The side plates serve to maintain the materials or objects within the area of the conveyor belt. Especially for granular materials or objects having a low friction connection with the conveyor belt, the speed with which the conveyor belt travels, and especially the speed through turn, might result in centrifugal forces forcing the materials or objects to one or the other side. If the side plates were not present, there would be a risk that the materials would be ejected from the conveyor belt. Additionally, the side plates serve to increase the loading capabilities of the conveyor belt in that, in particular for granular materials, a channel shaped conveyor belt is constructed. For this purpose, it is also important that the side plates extend beyond the extent of the belt links such that an overlap between two side plates is provided.

For some purposes, ribs provided extending from the top surface of the conveyor belt serve two purposes; first, where the materials, and in particular objects, are transferred from one conveyor belt to a conveyor belt according to the invention, it might be advantageous to have the ribs in order to facilitate a well-defined surface for these objects. At the same time, the ribs serve to provide extra drainage in processes where substantial amounts of liquid, and in particular water, have to be part of the process. In this manner, the ribs serve to elevate the objects from the top surface of the conveyor belt such that additional drainage is provided between the ribs for guiding the excess liquid to the drainage openings provided by the apertures between the rear hinge parts in the belt links.

In some applications where conveyor belts according to the present invention are used, the high travelling speed of the belt in combination with the side-flexing capabilities of the belt may give rise to rattling, or one or several belt links trying to escape the transport plane. For this purpose, the belt links may be provided with guidance flanges that extend from the sides of the belt links. In the conveyor structure, which usually is made from steel, guidance members may be provided at appropriate sections of the conveyor belt for engagement with the guidance flanges in order to maintain the belt links, and thereby the conveying surface, in an even transport plane. The guidance flanges may be provided as snap-on features, which may be applied to all or several of the belt links in the conveyor belt, or they may be provided as integral parts of the outermost parts of each belt link.

In order to maintain a high conveyor belt speed, it may be advantageous to improve the friction capabilities of the transport surface such that articles, granulates, or objects transported on the top surface of the belt links (and thereby the conveying surface) may have an increased friction so that transport and stable positioning on the conveyor belt's transport surface is improved. In a particularly advantageous embodiment, a rubber composition may be sprayed on the newly injection-moulded plastic belt links while they are still very hot. By spraying on the composition immediately after de-moulding, a chemical bond is created between the belt links and the friction-enhancing material. This provides for a very long-lasting, durable, and relatively cheap friction enhancement. Of course, rubber may be alternatively applied to the top surfaces of the belt link using an adhesive or the like or may be otherwise fastened to the belt link in any of a variety of known ways.

The belt links may be made from one or more of the following groups of materials:

plastics such as PP, PE, PVC, acetal and others where the materials may comprise additives such as silicone oils, Teflon®, and the like, and, in particular, plastic materials particularly suitable for moulding and injection-moulding;

metals, either castable metals such as steel, copper, aluminium, and suitable alloys or in sheet form where the blanks made from, for example, steel or aluminium are processed, for example, by rolling, bending or shaping into belt links; and composites, either comprising resins or cement as binders and optionally fibre-reinforced composites, where fibres may be chosen from glass-, plastic-, steel-, cellulose- or other suitable fibres.

The choice of material naturally depends on the particular application of the conveyor belt and the supporting conveyor structure. For a number of applications, especially in the food processing industry, belt links made from a plastics material are preferred, whereas in other industries, depending on the environment in which the conveyor is operating, other materials may be preferred.

Depending upon the properties desired in the final belt link product, the raw materials used may be wholly or partially comprised of electrically-conductive materials, non-flammable materials, glass-reinforced materials, UV-stable materials, and/or anti-microbial materials. Moreover, it is also possible for each belt link to be moulded in two stages whereby particular additive materials are included in only one of the two moulding components.

Particularly when working with the pinless belt link modules of the present invention where adjacent modules may rub against each other rather than against a connecting pin, there is a possibility of increased noise levels when the conveyor is in operation. The additives, such as Teflon®, serve to reduce the operating noise and heat generated by the belt links and/or the friction between the links. It should be noted that the choice of additives for specific applications, such as in the food processing industry, must also be suitable and approved for the particular use. Usually, the additives are added to the raw materials from which the links are manufactured such that the additives, and thereby the advantageous features of the additives, are integral in the materials used. This can be done, for example, by mixing pellets of the additive with the other raw material(s) on site just prior to moulding. Alternatively, it is also possible to have pre-mixed pellets.

In one preferred embodiment, Teflon® (PTFE) makes up 2-20% by weight of the belt link material.

In a further advantageous embodiment, one or more sprocket wheels may be provided for engaging and propelling the conveyor belt, relative to a conveyor structure, where each sprocket wheel comprises a number of sprockets arranged along the wheel's circumference, such that the sprockets are adapted for engagement with the bottom of one or more of the apertures provided between the hinge parts. The inventive construction of the belt link makes it possible for the sprockets on the sprocket wheel to engage directly in the bottom sections of the apertures. In the prior art, cams are often provided on the underside of the belt links that are transverse to the travelling direction, such that the drive wheels may engage the cams in order to propel the belt links, and thereby the entire conveyor belt. This, however, is not necessary with the belt links (and thereby the conveyor belt) according to the present invention in that the sprocket wheel may engage directly in the apertures provided between the hinge parts.

In a further advantageous embodiment of the conveyor, the one or more sprocket wheels may have two parallel rows of sprockets arranged along the wheels circumference, where the sprockets in a first row are offset in relation to the sprockets in a second row, such that the sprockets in the first row are suitable for engagement with the apertures on one end of the belt links for propelling the conveyor belt in a first direction and that the sprockets in the second row are suitable for engaging the apertures in the opposite end of the belt links for propelling the conveyor belt in the opposite direction. By having a double sprocket wheel where one set of sprocket engages the apertures between the hinge parts on one end of the belt links, and a second set of sprockets which are off-set such that they are adapted to engage the apertures between the rear hinge parts on the other side of the belt link, it is possible to provide a conveyor belt that is reversible in that the sprocket wheels may be rotated in any direction with the same good and firm engagement via the sprockets to the belt links such that the rotational forces provided to the sprocket wheels is transferred by the sprockets to the belt links, and thereby to the conveyor belt.

Although above the invention has, in some embodiments, been described with reference to belt links and conveyor belts made from plastic materials, and in particular injection-moulded belt links, it is also contemplated within the scope of the present invention that the belt links may be manufactured from different materials. For example, the links may be manufactured from blanks of a steel or other metal material such that the blank corresponds to the entire surface of a belt link. By simply rolling the blank on itself, and thereby creating the three-dimensional shape of the belt link, a belt link according to the invention may be manufactured. Also, for other materials such as aluminium or aluminium alloys, it is possible to cast separate belt links in appropriate moulds. This is also true for other castable materials such as, for example, fibre-reinforced plastics, fibre-reinforced composite materials, cement-based composites with or without fibre reinforcement, etc.

In a further advantageous embodiment, one or more electrical and/or hydraulic motors are provided for driving one or more axles engaging one or more sprocket wheels arranged at predetermined distances along the conveying path for driving the conveyor belt, and one motor is designated the master motor where output from the master motor is used as input for controlling and synchronizing output of drive forces from the other motors. Optionally, counter rollers are provided for countering the possible deformations in the conveyor belt caused by the one or more sprocket wheels, and these counter rollers are arranged on the opposite side of the belt as to the engaging sprocket wheels.

Especially for long conveyors, i.e., conveyors having a long conveying path of, for example, 40-50 meters, and possibly comprising a number of turns, it is necessary to provide more than one belt drive mechanism. However, more drive mechanisms, each comprising a motor, create a disturbance in the belt link by, for example, creating extra tension around the engagement position in the belt. Furthermore, due to even minor differences between the motors, unevenness will be created in the conveyor belt. This causes articles conveyed to become unstable, whereby the belt needs to be operated at slower speeds so that the articles/objects are not displaced, do not fall over, are not damaged, or do not fall off the conveyor. It is, therefore, advantageous to designate one motor as the master and, when using electrical motors, to synchronize the other motors, for example by using VLT controls. Additionally, counter rollers may be provided in order to maintain the top side of the belt in the transport plane, especially around the places where the sprocket wheels engage the conveyor belt link belt. With these rollers, rattling, shaking and wobbling may be minimized or avoided.

BRIEF DESCRIPTION OF THE DRAWINGS

The invention will now be explained in detail with reference to the accompanying drawing, wherein an embodiment of the invention is disclosed.

FIG. 13 illustrates the top of a belt link in accordance with an alternate embodiment of the present invention.

FIG. 14 illustrates the bottom of a belt link in accordance with yet another alternate embodiment of the present invention.

DETAILED DESCRIPTION OF ILLUSTRATIVE EMBODIMENTS

Figure 1:
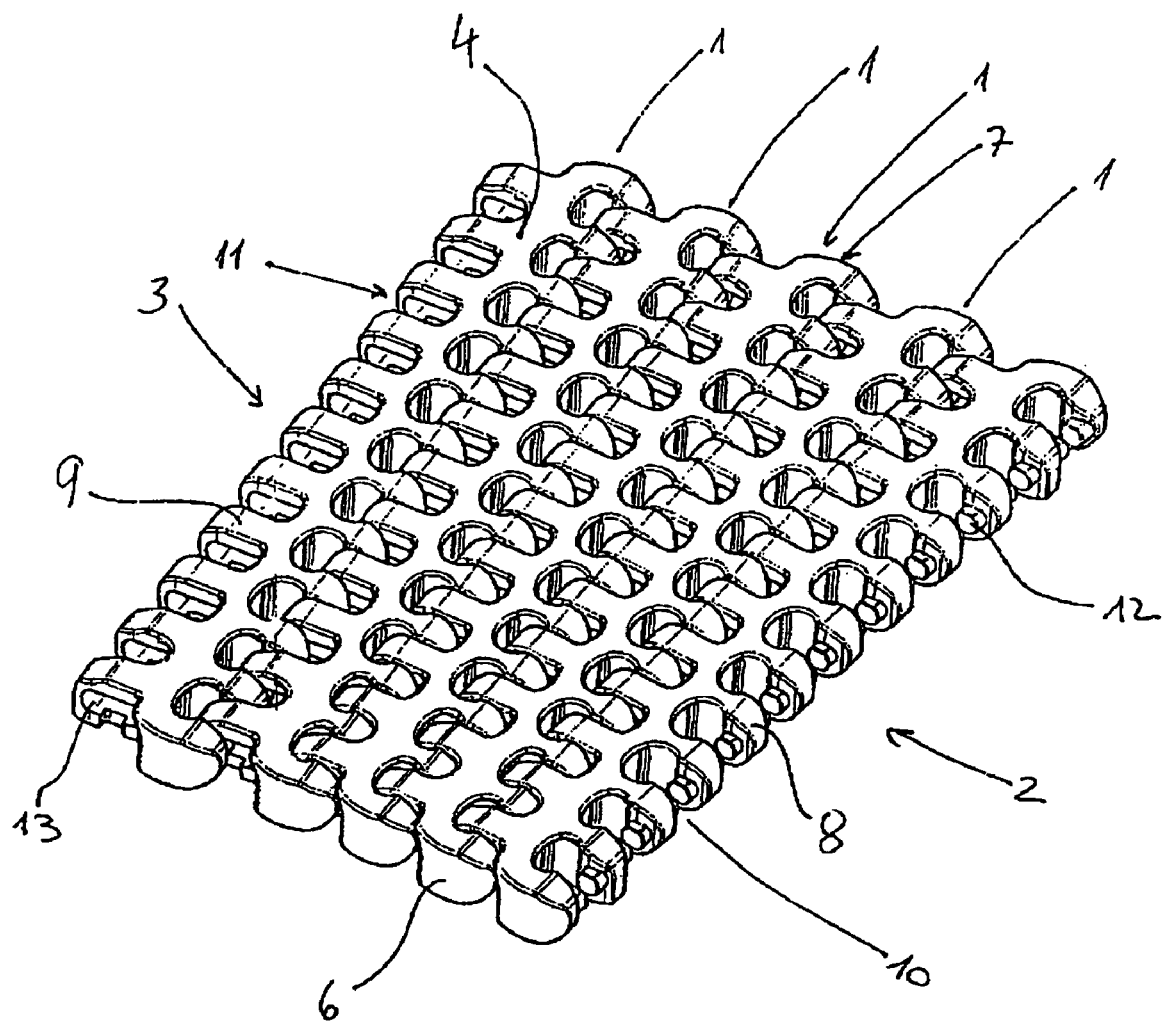
FIG. 1 illustrates a section of a conveyor belt assembled from a number of belt links.

FIG. 1 illustrates a conveyor belt assembled from a number of identical belt links 1. Each link is defined by a front end 2, and a back end 3, a top surface 4, and a bottom surface 5 (see FIG. 2), and two sides 6, 7. Along the front and back ends 2 and 3, front hinge parts 8 and rear hinge parts 9 are arranged separated by apertures 10, 11 respectively such that the front hinge parts 8 arranged along the front end 2 may be inserted in the apertures 11 arranged between the rear hinge parts 9 along the back end 3.

The front hinge parts 8 along the front end 2 are provided with protrusions 12 that are of a size such that they will fit inside elongated apertures 13 arranged in the rear hinge parts 9 along the back end 3 of a belt link. In this manner, a side-flexing hinge connection may be established between two adjacent belt links such that a conveyor belt is created.

Figure 2:
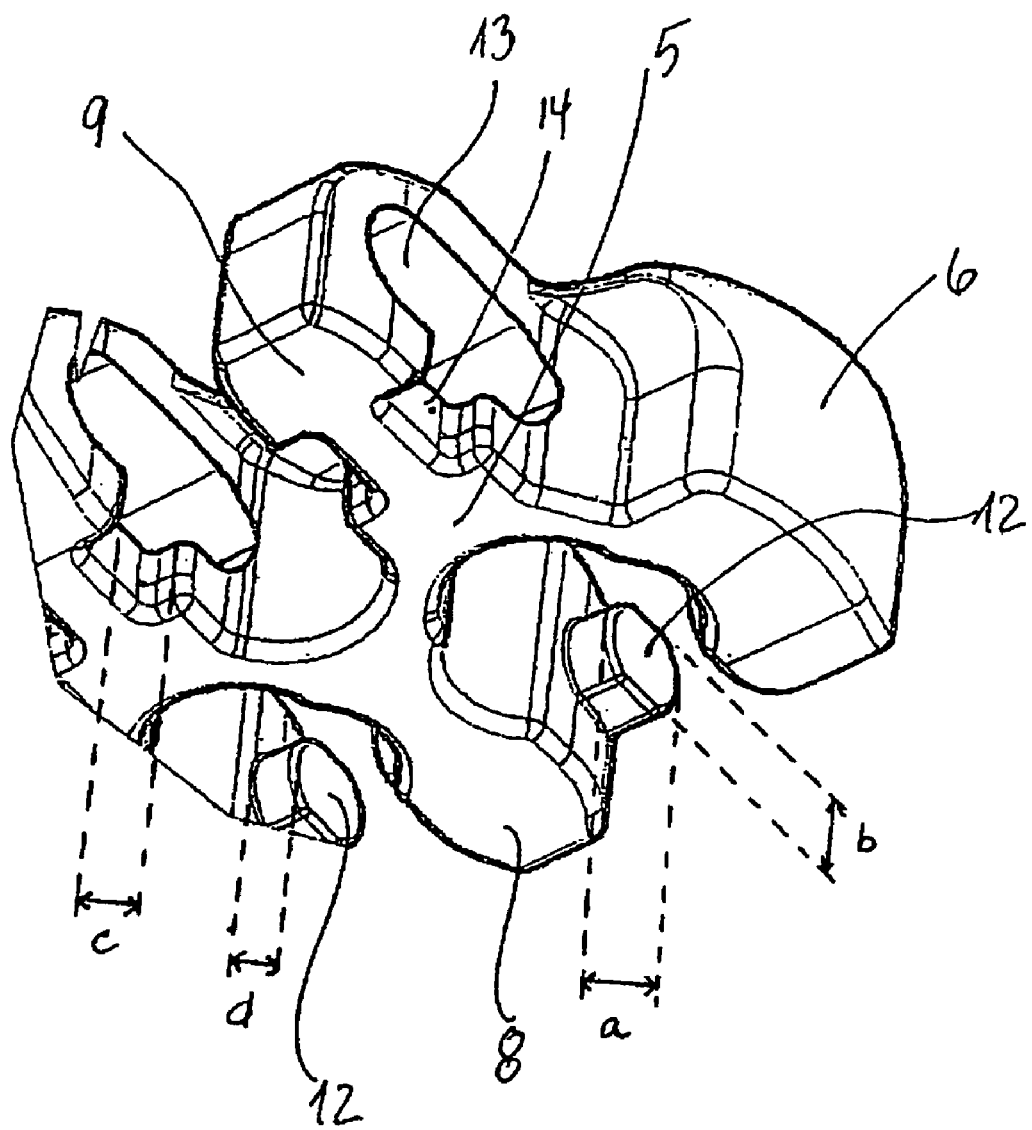
FIG. 2 illustrates a section of a belt link in accordance with one embodiment of the present invention.

Turning to FIG. 2, a section of a belt link 1 according to the invention is illustrated. The side 6 as well as the bottom surface 5 are identified. The end of the belt link is illustrated as seen from below.

In the elongated apertures 13 provided in the rear hinge parts 9, a recess 14 is provided. The recess is shaped such that it has an opening of a size "c" in the lengthwise direction of the conveyor belt, which is equal to, or larger than, the height "b" of the protrusion 12, perpendicular to the loading surface/top surface 4 of the conveyor belt. The length of the protrusion 12 in the intended traveling direction of the conveyor belt is "a" and the relation between "a" and "c" is such that "a" is larger than "c," whereby the protrusions when arranged in the apertures 13 during normal travel will not be able to pass through the recess 14. In order to connect or disconnect two adjacent belt links, one belt link must be pivoted substantially 90° in relation to the other belt link such that the height dimension "b" of the protrusion 12 may be passed through the opening "c" in the recess. The depth of the recess 14 perpendicular to the intended traveling direction of the conveyor belt must be sufficient to accommodate the extent "d" of the protrusion 12. In this manner, a belt link is constructed that may easily be connected to identical belt links in order to create a side-flexing and hinged conveyor belt structure without the use of transverse rods or other secondary means, but which will be connected simply by providing protrusions in front hinge parts 8, which interact with elongated apertures 13 in rear hinge parts 9.

Figure 3:
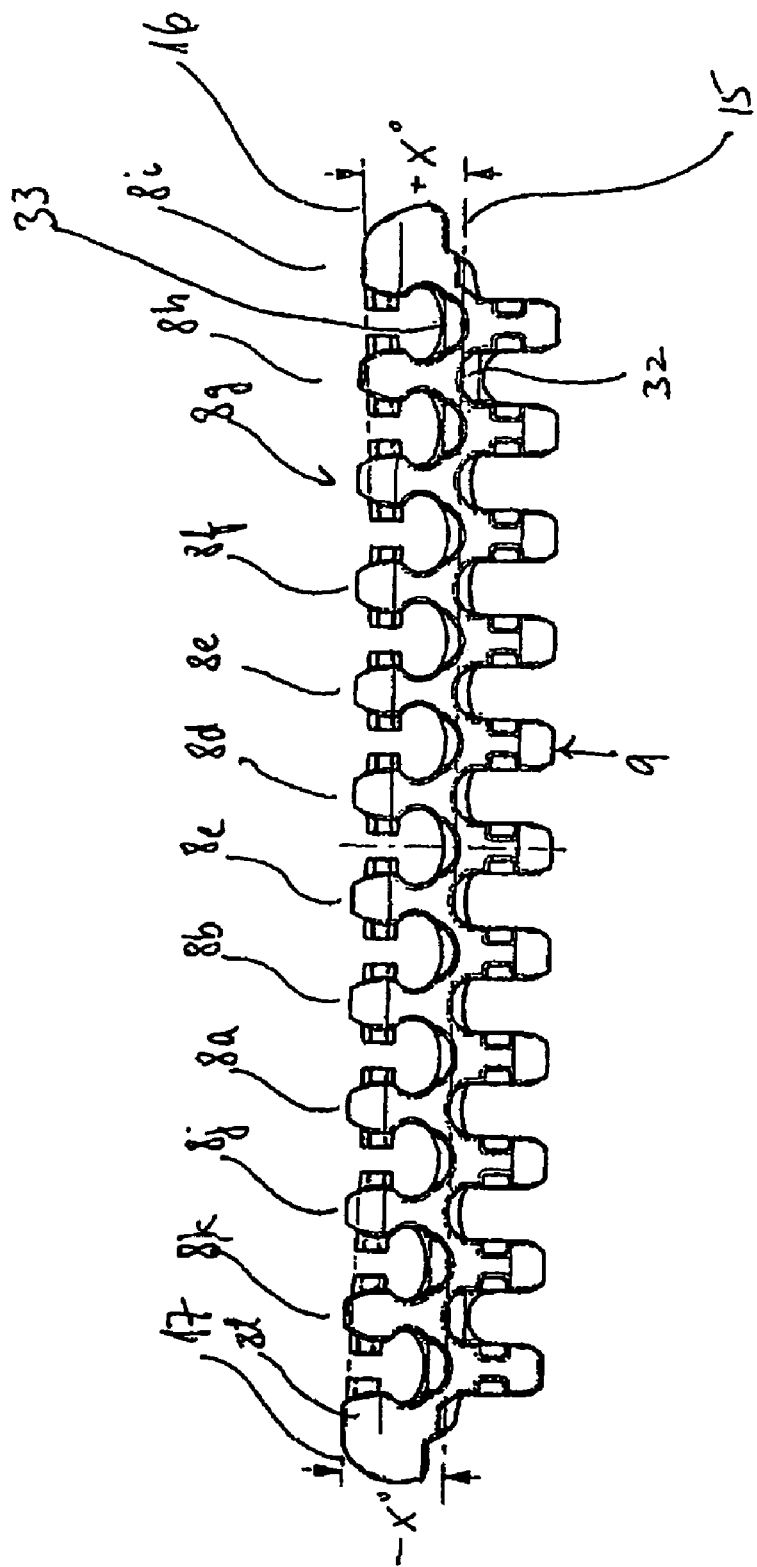
FIG. 3 illustrates the bottom of a belt link in accordance with one embodiment of the present invention.

FIG. 3 illustrates a single belt link from below in accordance with one embodiment of the present invention. One of the main features (and the reason why so many advantages are achieved with the present invention) is the fact that the protrusions 12 along the front end 2 and/or the elongated apertures 13 arranged in the rear hinge parts 9 along the back end 3 are arranged such that the they are parallel to three different axes. In the illustrated embodiment of FIG. 3, the protrusions are variously aligned along, or parallel to, three axes 15, 16, and 17. A first axis 15 is defined as being transverse to the links, i.e., substantially perpendicular to the intended traveling direction of the assembled conveyor belt structure. A number of these protrusions arranged on the centrally placed front hinge parts 8a-8f are arranged parallel to the first axis 15. On the outer front hinge parts 8g-8i in the illustrated example in the right-hand side of the depicted belt link, protrusions are arranged parallel to a secondary axis 16. In an analogous, mirror image way concerning the outer front hinge parts 8j-8l, the protrusions are arranged parallel to a further secondary axis 17. In the illustrated embodiment, the two secondary axes 16 and 17 are angled plus or minus x° in relation to the first axis 15, although it is not necessary that the positive and negative angles be identical in magnitude.

At the same time in this embodiment, the elongated apertures 13 arranged in the opposite rear hinge parts 9 that are to receive the protrusions on adjacent belt links are arranged such that the extend of the apertures are all arranged equally equidistant to the first axis 15. When two belt links of this type are assembled and the resulting conveyor belt is running through straight sections of the conveyor, only the front hinge parts 8a-8f will engage the wall of the elongated apertures 13 from the adjacent belt link. As the conveyor belt side-flexes due to a turn in the conveying direction where the turn corresponds to the angle x, the appropriate right-hand side or left-hand side protrusions will engage the corresponding walls of the elongated apertures arranged on the adjacent belt link. In the illustrated example, the protrusions arranged on the front hinge parts 8g-8i will engage when the conveyor turns to one side, whereas the protrusions arranged in the front hinge parts 8j-8l will engage when the side-flexing conveyor turns to the opposite side. If the protrusions are arranged along a straight line, a majority of the forces arising when the conveyor belt flexes would be transferred to the belt link via one protrusion 8i or 8l respectively. Due to the flexibility inherent to the plastic material, a minor part of the forces could have been transferred to a neighboring protrusion. This prior art construction would induce severe stresses in the belt link structure, whereby the risk of terminal failure is greatly increased. The construction of the present invention, however, by distributing the forces over more hinge parts, substantially reduces the build-up of stresses in the belt link such that failure may be avoided altogether.

In the illustrated example, the angle x is approximately equal to 2.2°. Other angles may be chosen, depending on the overall design of the conveyor structure.

FIG. 13 illustrates a single belt link from above in accordance with an alternate embodiment of the present invention. In this embodiment, the protrusions 12 along the front end 2 vary in thickness depending whether they are near the middle of the link or at one of the two sides such that the inner sides of the protrusions (the side opposite the leading edge of the link) end up arranged such that the they are parallel to three different axes 15a, 16a, and 17a. Just as with the earlier embodiment, a first axis 15a is defined as being transverse to the links, i.e., substantially perpendicular to the intended traveling direction of the assembled conveyor belt structure. In the illustrated embodiment of FIG. 13, a pair of protrusions is arranged on the centrally placed front hinge part 40a along with the more centrally-located protrusions from each adjacent front hinge part 40b and 40c such that the inner sides of the four protrusions are parallel to the first axis 15a. On the outer front hinge parts 40d-41e in the illustrated example nearer one side of the depicted belt link and on the outermost side of front hinge part 40b, the front-to-back thickness of the protrusions is gradually diminished when moving towards the side of the link such that, while the front side of the protrusions remain aligned on an axis perpendicular to the direction of belt travel, the inner sides of these protrusions are arranged parallel to a secondary axis 16a. In an analogous, mirror image way concerning the outer front hinge parts nearer the opposite side of the link 40f and 40g and the outermost side of front hinge part 40c, the inner sides of the protrusions are arranged parallel to a further secondary axis 17a. In the illustrated embodiment, the two secondary axes 16a and 17a are angled plus or minus x° in relation to the first axis 15a, although it is not necessary that the positive and negative angles be identical in magnitude. As with the earlier embodiment, the elongated apertures 13 arranged in the opposite rear hinge parts 9 that are to receive the protrusions on adjacent belt links are arranged such that the extent of the apertures are all arranged equally equidistant to the first axis 15.

When two belt links of this type are assembled and the resulting conveyor belt is running through straight sections of the conveyor, only the four most centrally located front hinge part protrusions will engage the wall of the elongated apertures 13 from the adjacent belt link. As the conveyor belt side-flexes due to a turn in the conveying direction where the turn corresponds to the angle x, the inner sides of the appropriate right-hand side or left-hand side protrusions will engage the corresponding walls of the elongated apertures arranged on the adjacent belt link. As with the earlier embodiment, the construction of the present embodiment, by distributing the forces over more hinge parts, substantially reduces the build-up of stresses in the belt link such that failure may be avoided.

FIG. 14 illustrates a single belt link from below in accordance with still another alternate embodiment of the present invention. In this embodiment, the protrusions 12 along the front end 2 remain of similar thickness and aligned transverse to the links but the length in the traveling direction of one or more of the elongated apertures 13 in the rear hinge parts is varied depending upon whether they are at the middle of the link or nearer to one of the two sides so as to create three alignment axes 15b, 16b, and 17b.

The length in the traveling direction of the elongated apertures within the centrally-located rear hinge parts 42a-42e is constant such that the ends of these elongated apertures nearest the back end of the link are arranged on an axis parallel to the first axis 15b. The length in the traveling direction of the elongated apertures in outer rear hinge parts 42f-42i on one side of the link is varied, with the length being greater in the elongated apertures closer to the side of the link, such that the ends of these outer elongated apertures nearest the back end of the link are parallel to an axis 16b angled +x° in relation to the first axis. In an analogous, mirror image way concerning the rear hinge parts nearer the opposite side of the link 42j-42m, the length in the traveling direction of the elongated apertures is varied, with the length being greater in the elongated apertures closer to that opposite side of the link, such that the ends of these outer elongated apertures nearest the back end of the link are parallel to an axis 17b angled approximately −x° in relation to the first axis, although it is not necessary that the positive and negative angles be identical in magnitude.

When two belt links of this type are assembled and the resulting conveyor belt is running through straight sections of the conveyor, only the end wall of the elongated apertures associated with rear hinge parts 42a-42e will engage the protrusions from the front hinge parts from the adjacent belt link. As the conveyor belt side-flexes due to a turn in the conveying direction where the turn corresponds to the angle x, the inner sides of the appropriate right-hand side or left-hand side protrusions will engage the corresponding walls of the elongated apertures arranged on the adjacent belt link. As with the earlier embodiment, the construction of the present embodiment, by distributing the forces over more hinge parts, substantially reduces the build-up of stresses in the belt link such that failure may be avoided.

As is evident in particular from FIG. 1, but also from FIG. 2, the front hinge parts 8 typically have the same extent in the width direction, i.e., parallel to the first axis 15, as the rear hinge parts 9. Therefore, only a very minimal play in the transverse direction of the entire conveyor belt structure is present. This, in turn, provides for stable and smooth running of the conveyor belt structure. The shape of the apertures between the front hinge parts is in the shape of key holes. With such a construction, it is possible to drain liquid from the surface of the conveyor belt structure even when the links are pushed together, which may be the case when the conveyor belt is negotiating a turn as illustrated in FIG. 1. Alternatively, it may also be possible to circulate gas through the conveyor belt structure perpendicular to the transport plane such that continuous cooling or heating of items placed on the conveyor belt may be carried out.

Figure 4:
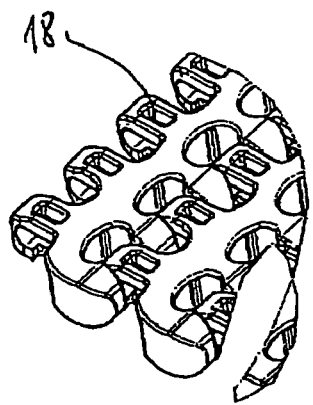
FIGS. 4-10 illustrate particular features of further embodiments in detailed views, where the features may be applied alone or in combinations.

An additional advantage of the present invention is the high degree of hygiene that can be achieved. In addition to providing easy assembly and disassembly of adjacent belt links, the recesses 14 provided in the elongated apertures in the rear hinge parts 9 also provide for improved drainage of liquids present in the elongated apertures. The hinge part protrusions 12, which move back and forth in the intended traveling direction of the conveyor belt structure, help to push foreign matter back and forth in the elongated aperture such that this matter may be evacuated through the recesses 14. By additionally providing an aperture 18 in the rear hinge parts 9 connecting the top surface 4 of the belt link 1 with the elongated aperture 13 (as illustrated in FIG. 4), improved drainage from the top surface of the belt links is provided. Furthermore, it is possible to inject cleaning fluids such as water through the aperture 18, and thereby improve the cleaning fluid circulation around the protrusions in the elongated apertures 13 such that a high degree of hygiene may be achieved by removing the foreign matter that could otherwise be lodged between the elongated apertures 13 and the protrusions 12 arranged in the front hinge parts 8. The elongated aperture provides for movement of the protrusions 12 in the intended traveling direction of the conveyor belt whereby the side-flexing capabilities of the conveyor belt structure is achieved. At the same time, the protrusion will, together with the cleaning fluid injected through the aperture 18, provide a very thorough cleaning of this base in the elongated aperture.

The inventive conveyor belt according to the invention may be provided with one or more additional features as illustrated with reference to FIGS. 5-9.

Figure 5:
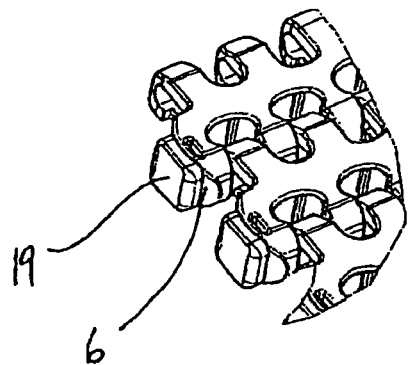

Turning to the embodiment of FIG. 5, wear plates 19 are attached to the outermost sides 6,7 of the conveyor belt structure. As a conveyor belt of the side-flexing type travels through a turn as illustrated in FIG. 1, one side of the belt will be contracted while the opposite side of the belt will be expanded. Furthermore, the side where the belt is contracted will usually be guided through the turn by a guidance member provided in the conveyor structure. Due to the very high speed of conveyors, which typically travel at 60-80 meters per second, a substantial amount of friction between the side 6 and the guide member (not illustrated) of the conveying structure arises. This friction causes heavy wear, and also generates substantial friction heat. In order to counter these problems, the belt links may, as illustrated in FIG. 5, be equipped with wear plates 19. In the illustrated example, the wear plates 19 are attached to the side face 6 of the belt links. However, the wear characteristics of the wear plate may also be integrated in the outermost front hinge part such that the superior wear characteristics are integral with the outermost rear hinge parts of the belt links. The wear plate may be made from a wide range of materials, but especially preferred is Kevlar-reinforced plastics, which, in addition to having extremely good wear capabilities, are also very heat-resistant. The wear plates 19 may also be provided with a Teflon®-coating or be made from a material having low friction characteristics, such that the friction and the heat generated thereby are reduced.

In a preferred embodiment of a wear plate 19, the plate is designed so as to have a shape that generally mimics the curve of the conveyor belt as it is contracted while flexing around an inward turn. By having the side of the wear plate on the outside of the belt link shaped in a generally convex manner when viewed from the front to the back of the belt link, the wear plate 19 will have at least two, and possibly more, points of contact with the side supports of the conveyor structure when the belt flexes around an inside turn during use. Having multiple contact points will reduce wear on the part itself, vibration, shatter, noise, and the creation of frictional heat while allowing for a smoother conveyor belt ride. Such a construction may also allow for higher belt speeds without heating the wear part to critical temperatures.

Figure 6:
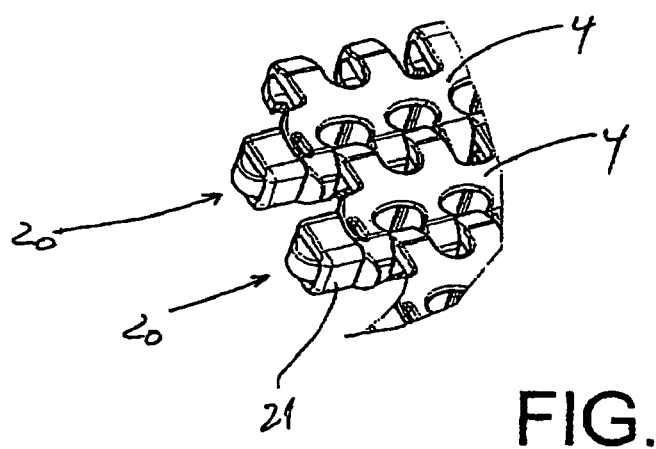

A reduction in friction and heat may also be achieved by providing rollers 20 as illustrated in FIG. 6. The rollers are arranged for rotation around an axis substantially perpendicular to the top surface 4 of the conveyor belt and such that they may roll on the guide member provided in the conveying structure. In this embodiment, the rollers are illustrated as being separate members 21 that may be snapped on to the end of the belt links 1. It is also contemplated that the rollers 20 may be shaped integrally with the outermost front hinge parts of the belt links such that rollers become an integral part of each belt link.

Although the wear plates 19 in FIG. 5 and the rollers 20 in FIG. 6 have only been illustrated on a cut-out section of the belt links, where the side-flexing conveyor belt is suitable for flexing to both sides, these additional features may be provided on both sides of the conveyor belt.

Figure 7:
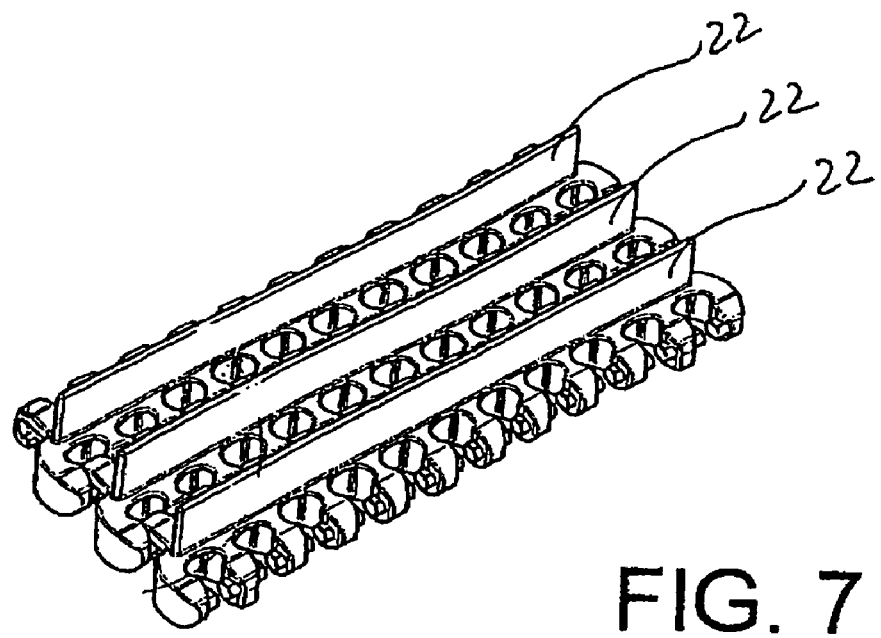

In the embodiment of FIG. 7, the top surface 4 of each belt link has been provided with compartment members 22. The compartment members 22 span substantially the entire width of each belt link. In the illustrated embodiment, the compartment members are molded integral with the belt links, but they may also be provided as snap-on features that may be installed after assembly of the belt. The compartment members serve to maintain the objects or items that are to be transported on the conveyor belt in their position on the conveyor belt, even when the conveyor belt is traveling up or down inclines in the conveying path. Although each belt link is illustrated in FIG. 7 as having a compartment member, it is also possible to provide compartment members on less than all belt links, e.g., every second or third, depending on the size of the objects that are to be conveyed on the conveyor.

Figure 8:
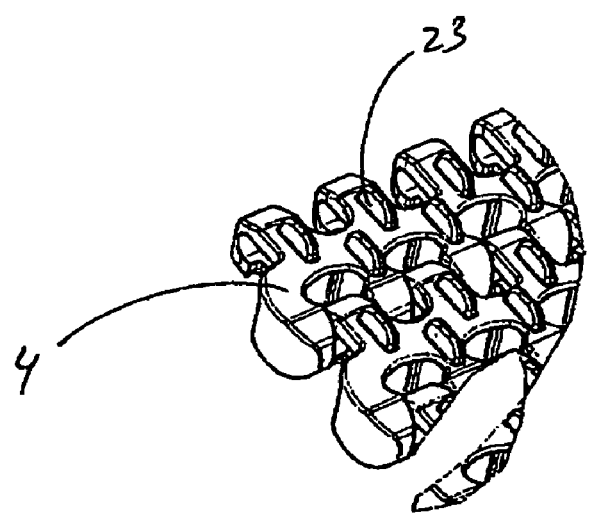

Turning to the embodiment of FIG. 8, the top surface 4 is provided with ribs 23. The ribs 23 are off-set in relation to each other such that a stable support will be provided for items, in particular cans, jars and the like, by the conveyor belt, while still allowing fluids and gasses to have improved drainage under and around the items and through the keyhole-shaped apertures arranged between the front hinge parts.

Figure 9:
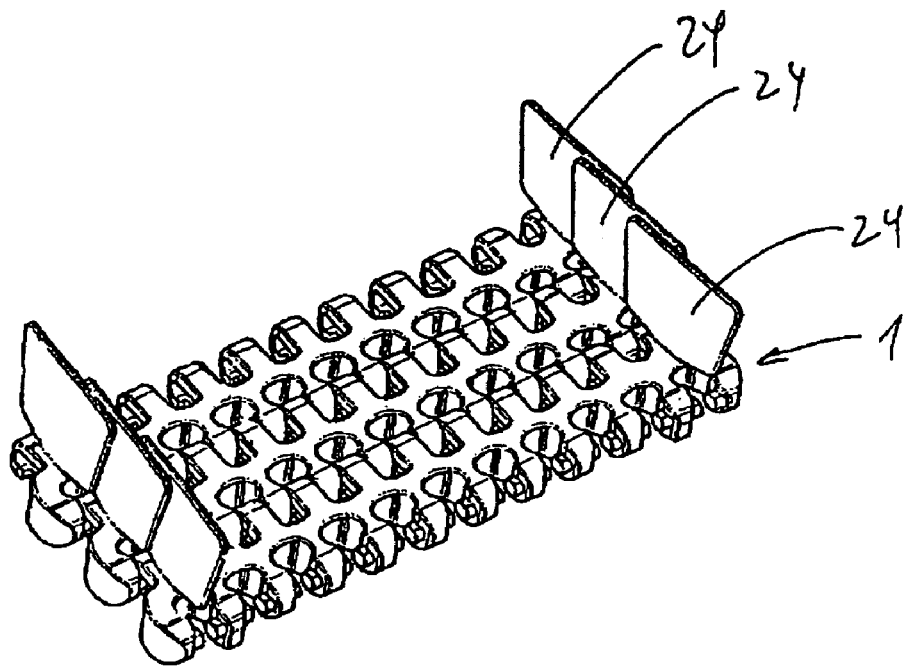

In the embodiment of FIG. 9, the belt links are provided with side plates 24. The side plates 24 are arranged along the sides of the belt links 1 such that, even when the conveyor belt side-flexes through a turn, the side plates on adjacent belt links will overlap. By this construction, a channel-shaped conveyor is created such that particular materials, such as peas, plums, berries, and other fruits and vegetables, or granular materials, may be transported on the conveyor without the risk of overflowing the conveying structure. The openings in the top surface 4 of the conveying surface are preferably so small that fingers from personnel cannot be squeezed or stuck. At the same time, when conveying particular material, whether it be raw materials or food stuffs, it should be kept in mind that the particles conveyed should have a size that is at least slightly larger than the maximum openings. The maximum opening will occur when the distance between two adjacent belt links is the largest such that a substantial part of the key-hole aperture provided in the front side of the belt link is exposed.

For a number of applications, it may be advantageous to combine several of the features mentioned above such that, for example, belt links provided with side plates also will have the integral compartment members in order to transport a sufficient load without having agglomerations of materials at the foot of inclines or the like.

Figure 10:
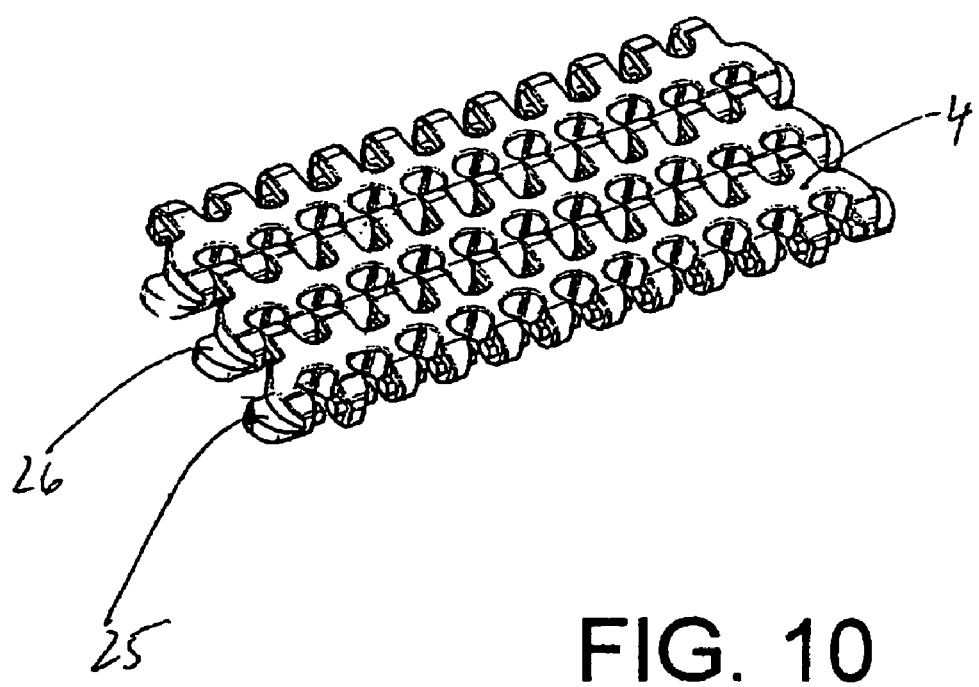

In a further advantageous embodiment, as illustrated in FIG. 10, the belt links are provided with guide flanges 25 arranged in the outermost side parts of the belt links. The guide flanges have a top surface 26 that is lower than the top surface 4 of the belt link in relation to the rolling surface of the conveyor belt structure. The guide flanges are provided to avoid having belt links in one section of the conveyor belt structure wobble or be squeezed out of the transport plane, for example when going through turns where the tensions arising due to the pulling/pushing forces apply to the conveyor belt in order to provide the transport. For this purpose, the guide flanges cooperate with guide members arranged in the conveying structure (not illustrated) such that a guide member will overlap the surfaces 26 in order to maintain the top surface 4 of the belt links in a common plane. In practice, the guide members that interact with the top surfaces 26 of the flanges 25 are only provided along certain stretches of the conveyor belt where it is known that stresses in the conveyor belt may agglomerate.

It should be noted that, although the compartment members 22, the ribs 23, the side plates 24, the guide flanges 25, as well as other features of the inventive belt link and resulting conveyor belt structure are described as independent features, any combination of these features may be contemplated in that the skilled person would recognize the advantages achieved by applying or combining various of the inventive features in order to provide an overall conveyor belt structure that benefits from one or more of the advantages made possible by the present invention.

Figure 11:
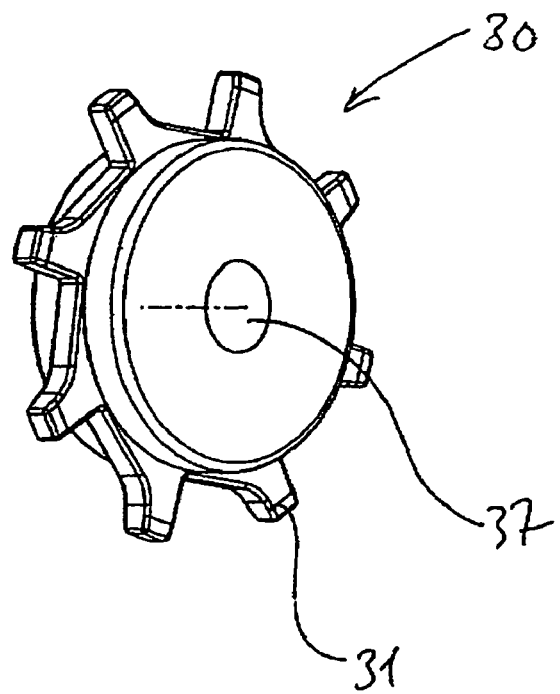
FIG. 11 illustrates a sprocket wheel for use with the conveyor belt links

Turning to the embodiment of FIG. 11, a sprocket wheel 30 is illustrated. Along the circumference of the sprocket wheel 30 are arranged a number of sprockets 31. Each sprocket 31 is designed to engage a bottom section 32, 33 (see FIG. 3) in order to propel the conveyor belt along the conveying path. The shape of the sprockets 31 corresponds to the openings in the assembled conveyor belt structure once the links 1 are interconnected by arranging the hinge parts in the corresponding apertures between two hinge parts on the opposite side of a belt link such that only very small openings are provided.

Due to the inherent stiffness of the belt link structure according to the construction described above, it is possible that only a very limited number of sprocket wheels 30 will be necessary to propel the conveyor belt structure without the risk of distortion or destruction of the belt as such.

Figure 12:
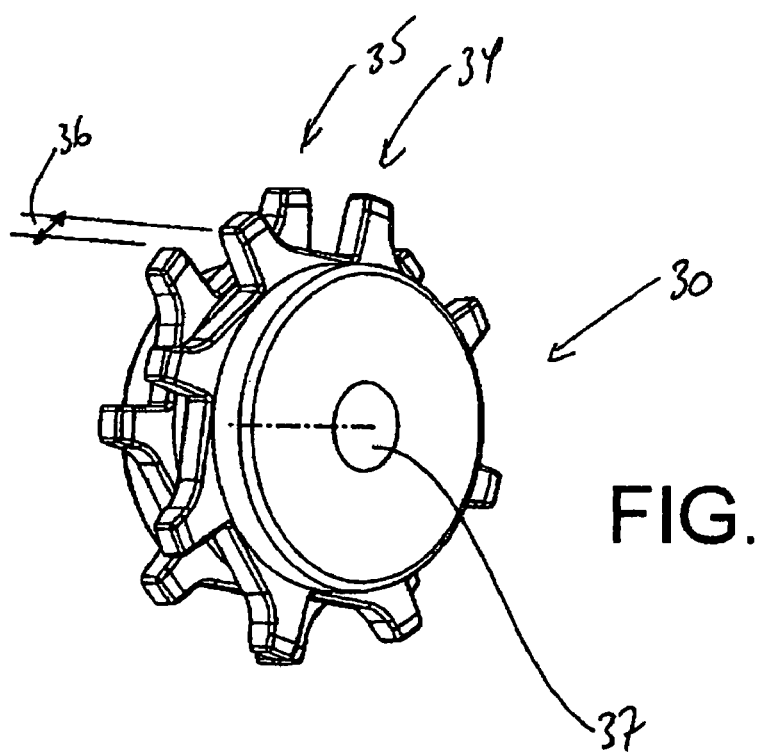
FIG. 12 illustrates a further embodiment of a sprocket wheel.

In an especially advantageous embodiment as illustrated in FIG. 12, the sprocket wheel 30 is provided with two parallel rows 34, 35 of sprockets along the circumference of the sprocket wheel. The sprockets in one row 34 are off-set in relation to the sprockets 35 in the other row. The distance of the off-set 36 is designed such that the first row of sprockets 34 will engage the bottom end sections 32 on each belt link in order to propel the conveyor belt in a first direction when rotating the sprocket wheel in a first direction, and by counter-rotating the sprocket wheel 30, the sprockets in the second row 35 will engage the oppositely-arranged bottom sections 33 in each belt link. The off-set 36, therefore, corresponds to the distance in a lengthwise direction between the two bottom sections 32, 33. Furthermore, the distance perpendicular to the intended traveling direction of the conveyor belt between the two rows of sprockets 34, 35 corresponds to the transverse direction between the bottom sections 32, 33. In this manner, it is possible to run the conveyor belt in two directions with the same sprocket wheel. As the conveyor belt, due to its inventive construction, does not have a preferred traveling direction, the conveyor belt is suitable for operation in either direction.

Although other features of the conveying structure have not been explicitly disclosed, it is understood that the inventive conveyor belt constructed by the belt link as described above will be suitable for any conventional conveying structure as such, and that the inventive sprocket wheels described above also may be mounted in connection with any well-known driving means such as, for example, an electric motor having an axle that may be arranged in the axle openings 37 of the sprocket wheels 30.

What is claimed:

1. A conveyor comprising an endless, side-flexing conveyor belt made from a plurality of rows of hinged interconnected belt links, where each row extends in a width direction substantially perpendicular to a traveling direction of the belt and comprises at least one link, where substantially all links further comprise:
    a front end substantially parallel to the width direction;
    a back end substantially parallel to the width direction;
    a top surface;
    a bottom surface;
    a pair of opposing side surfaces;
    front hinge parts separated by apertures arranged along the front end and having a top portion and a bottom portion that are substantially flush with the top and bottom surfaces respectively, two side portions, a free front portion, and protrusions on one or both side portions of a plurality of the front hinge parts each having an inner surface opposite the front end; and
    rear hinge parts separated by apertures arranged along the back end such that the front hinge parts of a link will fit inside the apertures on the back end of an adjacent link, and having a top portion and a bottom portion that are substantially flush with the top and bottom surfaces respectively, two side portions, a free front portion, and elongated apertures provided in the side portions of the rear hinge parts that are elongated in the traveling direction such that the protrusions on the front hinge parts fit inside the elongated apertures on an adjacent link;
    wherein the inner surfaces of one or more protrusions arranged centrally on the link are arranged on an axis substantially parallel to the width direction, and
    wherein the length in the traveling direction of the protrusions on one or more of the front hinge parts nearer at least one side of the link varies such that the length in the traveling direction of a protrusion near that side surface is smaller than the length in the traveling direction of an adjacent protrusion further from that side surface whereby the inner surfaces of these protrusions are arranged along an axis that is angled in relation to the axis of the inner surfaces of the centrally-located protrusions.

2. The conveyor of claim 1, wherein the angles of the axes of the inner surfaces of the protrusions nearer each side surface of the link are between 0° and 25° in relation to the width direction.

3. The conveyor of claim 2, wherein the angle of at least one of the axes of the inner surfaces of the protrusions nearer each side surface of the link is between 1° and 5° in relation to the width direction.

4. The conveyor of claim 3, wherein the angle of at least one of the axes of the inner surfaces of the protrusions nearer each side surface of the link is between 2° and 3.5° in relation to the width direction.

5. The conveyor of claim 1 wherein the links are made of a plastic that includes one or more additives selected from lubricating materials, electrically-conductive materials, non-flammable materials, glass re-inforced materials, UV-stable, and anti-microbial materials.

6. The conveyor of claim 5 wherein the plastic includes 2-20% by weight PTFE as an additive.

7. The conveyor of claim 1 wherein one or more of the links includes a rubber composition bonded, adhered, molded, or fastened to their top surfaces.

8. The conveyor of claim 1, wherein the conveyor belt has a width that corresponds to the width of one link.

9. The conveyor of claim 1, wherein, when viewed from the bottom surface, the apertures between the front hinge parts have a generally keyhole-shaped configuration and wherein the rear hinge parts are generally rectangular and have a width in the width direction that is just less than the narrowest section of the keyhole-shaped apertures such that it is possible for gas and liquid to pass through the belt from the top surface to the bottom surface when two adjacent links are pushed together.

10. The conveyor of claim 1, wherein a plurality of the protrusions have elongated cross-sections in the traveling direction such that the length of these protrusions in the traveling direction is greater than the height of these protrusions in a direction perpendicular to the top surface, and wherein there are recesses in the side portions of the rear hinge parts between the elongated apertures and the bottom portion of the rear hinge parts that have a length in the traveling direction that is greater than the height of these hinge part protrusions but less than the length of such protrusions in the traveling direction.

11. The conveyor of claim 1, further comprising one or more of the following:
    one or more of the rear hinge parts having an aperture perpendicular to the top surface that connects the elongated aperture of the rear hinge part to the top surface;
    a reinforced wear plate on one of the side surfaces;
    a roller arranged for rotation around an axis perpendicular to the top surface and located such that a rolling surface of the roller extends slightly outside one of the side surfaces;
    a compartment member extending in the width direction on the top surfaces of the links for substantially the entire width of the links, wherein the compartment member also extends in a direction substantially perpendicularly away from the top surface;
    a side plate extending substantially perpendicularly away from the top surface near one of the side surfaces of the link and having a size such that the side plate extends beyond the front edge and back edge of the link;
    a rib aligned parallel to the traveling direction and extending perpendicularly outwardly from the top surface of the link; and
    a guidance flange on one of the side surfaces and extending outwardly from the side surface and having a top portion that is between the plane of the top surface of the link and the plane of the bottom surface of the link.

12. The conveyor of claim 1, further comprising a reinforced wear plate on one of the side surfaces where the side of the wear plate opposite the side surface is generally convex in shape from the front end to the back end of the link.

13. The conveyor of claim 1, further comprising one or more sprocket wheels for engaging and propelling the conveyor belt relative to a conveyor structure, wherein each sprocket wheel comprises a number of sprockets arranged along the wheel's circumference such that the sprockets are adapted for engagement with the bottom of one or more of the front end or back end apertures.

14. The conveyor of claim 13, wherein the sprocket wheels have two parallel sets of sprockets arranged along the wheel's circumference and wherein the first set of sprockets is offset from the second set of sprockets such that the first set of sprockets is suitable for engagement with the bottom of one or more apertures on the front ends for propelling the conveyor belt in a first direction and the second set of apertures is suitable for engagement with the bottom of one or more apertures on the back ends for propelling the conveyor belt in a second direction opposite to the first direction.

15. A conveyor comprising an endless, side-flexing conveyor belt made from a plurality of rows of hinged interconnected belt links, where each row extends in a width direction substantially perpendicular to a traveling direction of the belt and comprises at least one link, where substantially all links further comprise:
    a front end substantially parallel to the width direction;
    a back end substantially parallel to the width direction;
    a top surface;
    a bottom surface;
    a pair of opposing side surfaces;
    front hinge parts separated by apertures arranged along the front end and having a top portion and a bottom portion that are substantially flush with the top and bottom surfaces respectively, two side portions, a free front portion, and protrusions on one or both side portions of a plurality of the front hinge parts; and
    rear hinge parts separated by apertures arranged along the back end such that the front hinge parts of a link will fit inside the apertures on the back end of an adjacent link, and having a top portion and a bottom portion that are substantially flush with the top and bottom surfaces respectively, two side portions, a free front portion, and elongated apertures provided in the side portions of the rear hinge parts that each have a rear end nearest the back end of the link and are elongated in the traveling direction such that the protrusions on the front hinge parts fit inside the elongated apertures on an adjacent link;
    wherein the rear ends of the elongated apertures on one more of the rear hinge parts arranged centrally on the link are arranged on an axis substantially parallel to the width direction, and
    wherein the length in the traveling direction of the elongated apertures on the rear hinge parts nearer at least one side of the link than the centrally located rear hinge parts varies such that the length in the traveling direction of the elongated aperture nearest that side surface is larger than the length in the traveling direction of the next most outermost elongated aperture nearest that side surface whereby the rear ends of these elongated apertures are arranged along an axis that is angled in relation to the axis of the rear ends of the centrally-located elongated apertures.

16. The conveyor of claim 15, wherein the angles of the axes of the rear ends of the elongated apertures nearer each side surface of the link are between 0° and 25° in relation to the width direction.

17. The conveyor of claim 16, wherein the angle of at least one of the axes of the rear ends of the elongated apertures nearer each side surface of the link is between 1° and 5° in relation to the width direction.

18. The conveyor of claim 17, wherein the angle of at least one of the axes of the rear ends of the elongated apertures nearer each side surface of the link is between 2° and 3.5° in relation to the width direction.

19. The conveyor of claim 15 wherein the links are made of a plastic that includes one or more additives selected from lubricating materials, electrically-conductive materials, non-flammable materials, glass re-inforced materials, UV-stable, and anti-microbial materials.

20. The conveyor of claim 19 wherein the plastic includes 2-20% by weight PTFE as an additive.

21. The conveyor of claim 15 wherein one or more of the links includes a rubber composition bonded, adhered, molded, or fastened to their top surfaces.

22. The conveyor of claim 15, wherein the conveyor belt has a width that corresponds to the width of one link.

23. The conveyor of claim 15, wherein, when viewed from the bottom surface, the apertures between the front hinge parts have a generally keyhole-shaped configuration and wherein the rear hinge parts are generally rectangular and have a width in the width direction that is just less than the narrowest section of the keyhole-shaped apertures such that it is possible for gas and liquid to pass through the belt from the top surface to the bottom surface when two adjacent links are pushed together.

24. The conveyor of claim 15, wherein a plurality of the protrusions have elongated cross-sections in the traveling direction such that the length of these protrusions in the traveling direction is greater than the height of the protrusions in a direction perpendicular to the top surface, and wherein there are recesses in the side portions of the rear hinge parts between the elongated apertures and the bottom portion of the rear hinge parts that have a length in the traveling direction that is greater than the height of these hinge part protrusions but less than the length of such protrusions in the traveling direction.

25. The conveyor of claim 15, further comprising one or more of the following:
    one or more of the rear hinge parts having an aperture perpendicular to the top surface that connects the elongated aperture of the rear hinge part to the top surface;
    a reinforced wear plate on one of the side surfaces;
    a roller arranged for rotation around an axis perpendicular to the top surface and located such that a rolling surface of the roller extends slightly outside one of the side surfaces;
    a compartment member extending in the width direction on the top surfaces of the links for substantially the entire width of the links, wherein the compartment member also extends in a direction substantially perpendicularly away from the top surface;
    a side plate extending substantially perpendicularly away from the top surface near one of the side surfaces of the link and having a size such that the side plate extends beyond the front edge and back edge of the link;
    a rib aligned parallel to the traveling direction and extending perpendicularly outwardly from the top surface of the link; and
    a guidance flange on one of the side surfaces and extending outwardly from the side surface and having a top portion that is between the plane of the top surface of the link and the plane of the bottom surface of the link.

26. The conveyor of claim 25, further comprising a reinforced wear plate on one of the side surfaces where the side of the wear plate opposite the side surface is generally convex in shape from the front end to the back end of the link.

27. The conveyor of claim 15, further comprising one or more sprocket wheels for engaging and propelling the conveyor belt relative to a conveyor structure, wherein each sprocket wheel comprises a number of sprockets arranged along the wheel's circumference such that the sprockets are adapted for engagement with the bottom of one or more of the front end or back end apertures.

28. The conveyor of claim 27, wherein the sprocket wheels have two parallel sets of sprockets arranged along the wheel's circumference and wherein the first set of sprockets is offset from the second set of sprockets such that the first set of sprockets is suitable for engagement with the bottom of one or more apertures on the front ends for propelling the conveyor belt in a first direction and the second set of apertures is suitable for engagement with the bottom of one or more apertures on the back ends for propelling the conveyor belt in a second direction opposite to the first direction.

* * * * *